United States Patent [19]

Hughes

[11] Patent Number: 4,556,593

[45] Date of Patent: Dec. 3, 1985

[54] PANELS OF THERMAL INSULATION MATERIAL

[75] Inventor: John T. Hughes, Worcester, England

[73] Assignee: Micropore International Limited, Worchestershire, England

[21] Appl. No.: 703,536

[22] Filed: Feb. 20, 1985

[30] Foreign Application Priority Data

Feb. 22, 1984 [GB] United Kingdom ............... 8404602

[51] Int. Cl.⁴ .................. B32B 1/04; B32B 3/02; B32B 5/16; B32B 5/22
[52] U.S. Cl. .................... 428/72; 428/76; 428/102; 428/157; 428/166; 428/194
[58] Field of Search ............ 428/68, 72, 76, 102, 428/104, 157, 166, 193, 194

[56] References Cited

U.S. PATENT DOCUMENTS

| 3,801,420 | 4/1974 | Anderson | 428/194 |
| 3,813,279 | 5/1974 | Varner, Jr. | 428/166 |
| 3,863,758 | 2/1975 | Connelly | 428/194 |
| 3,962,014 | 6/1976 | Hughes et al. | 428/76 |
| 4,224,366 | 9/1980 | McCabe | 428/72 |
| 4,250,172 | 2/1981 | Mutzenberg et al. | 428/102 |
| 4,294,405 | 10/1981 | Ross | 428/76 |
| 4,318,427 | 3/1982 | Cross, Jr. | 428/76 |

Primary Examiner—William J. Van Balen
Attorney, Agent, or Firm—Browdy and Neimark

[57] ABSTRACT

A panel of thermal insulation material has at least one main panel portion which comprises a dry particulate insulation material compressed within a porous envelope so that it is rigid or substantially rigid and at least one auxiliary panel portion which is secured to and extends along at least one of the edges of the or each of the main panel portions. The or each auxiliary panel portion comprises a substantially uncompressed dry particulate insulation material contained within an envelope. The insulation material of the auxiliary panel portion may be the same as or may be different from the insulation material of the main panel portion. The envelope of the auxiliary panel portion may be made of a porous or a non-porous material.

13 Claims, 5 Drawing Figures

PANELS OF THERMAL INSULATION MATERIAL

FIELD OF THE INVENTION

The present invention relates to panels of thermal insulation material having at least one main portion which is rigid or substantially rigid and at least one auxiliary portion which is relatively soft and flexible.

DESCRIPTION OF THE PRIOR ART

It is known from GB-A-1 350 661 that a rigid or substantially rigid panel can be produced by compressing a dry particulate insulating material within a porous envelope. Such a panel combines strength with excellent thermal insulation performance. The method of manufacture causes the edges of the panel to be rounded so that a deficiency of thermal insulation material can arise in these regions, particularly if the panel is butted against the corresponding edge of an adjacent panel which may also be rounded so that there is very little insulation material along the contacting edges.

OBJECT OF THE INVENTION

It is an object of the present invention to provide a panel of thermal insulation material which is not deficient in thermal insulation material in any region thereof.

SUMMARY OF THE INVENTION

According to the present invention there is provided a panel of thermal insulation material which comprises: at least one rigid or substantially rigid main portion comprising a dry particulate insulating material compressed within a porous envelope; and at least one auxiliary portion secured to and extending along at least one edge of the or each said at least one main portion, said at least one auxiliary portion comprising a substantially uncompressed dry particulate insulation material contained within an envelope.

The insulation material of said at least one main portion may be the same as or different from the insulation material of the said at least one auxiliary portion.

The insulation material may comprise a microporous thermal insulation material such as a finely divided metal oxide powder, for example silica, alumina or titania. The microporous material may be mixed with an infra-red opacifying powder such as titania in anatase or rutile form, ilmenite, iron oxide, chromium oxide or other metal oxides, metallic flakes or carbon. Additionally or alternatively the microporous material may be mixed with a reinforcing fibre such as ceramic fibre, glass fibre, alumina fibre, mineral wool or organic fibre.

The porous envelope of said at least one main portion may be made of a glass material such as a woven or non-woven fabric or may be made of other porous organic, inorganic or metallic materials. The envelope of said at least one auxiliary portion may be made of a porous material such as a glass fabric or another porous organic, inorganic or metallic material, or may be made of a non-porous material.

The auxiliary portion may be formed integrally with the main portion, for example by sewing glass fibre fabric into an envelope of the required shape and filling the envelope with loose thermal insulation material. The insulation material may be poured in by hand or may be blown into the envelope. Alternatively, the envelope may be suspended in a box which is then evacuated to suck the insulation material into the envelope by way of one or more nozzles. Channels may be stitched into the envelope to control the distribution of the insulation material.

Alternatively, the auxiliary portion may be secured to the main portion subsequent to the compression of the main portion. In this respect, a porous tube containing uncompressed insulation material may be stitched or glued to the edge of the main portion.

The auxiliary portion may be provided along a single edge of the main portion or may be provided along more than one edge as required.

We have found that the relatively soft and flexible auxiliary portion enables adjacent main portions to be bedded into each other or into another panel thereby eliminating gaps. This applies whether or not the adjacent main portions or panels are inclined to each other. The auxiliary portion provides excellent thermal insulation properties, although these may be inferior to the properties of the main portions of the panels.

For a better understanding of the present invention and to show more clearly how it may be carried into effect reference will now be made, by way of example, to the accompanying drawings in which:

DESCRIPTION OF PREFERRED EMBODIMENTS

Figure 1:
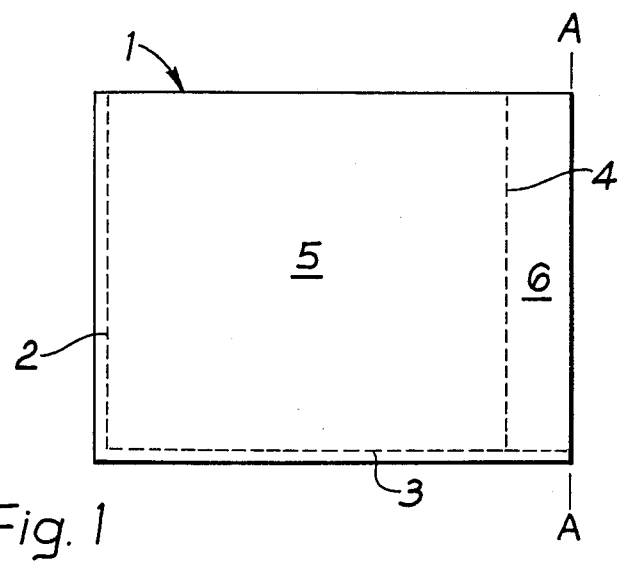
FIG. 1 shows a sheet of porous material for producing a panel according to the present invention.

As can be seen from FIG. 1, a panel of insulation material is made by first folding a sheet 1 of porous material such as woven glass fibres along the line A—A and stitching along dashed lines 2, 3, 4 to form an envelope comprising a main portion 5 and an edge portion 6.

Figure 2:
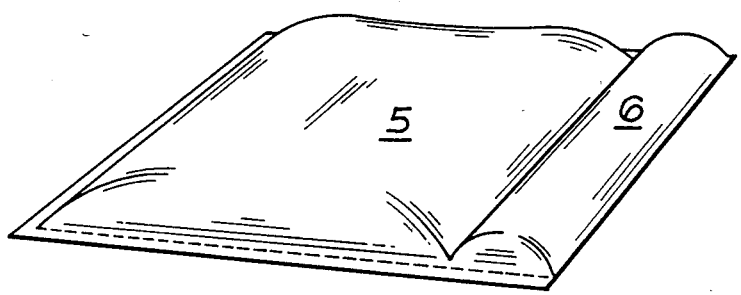
FIG. 2 shows the porous material filled with uncompacted thermal insulation material.

The envelope is filled with thermal insulation material, for example by pouring the insulation material by hand or by blowing or sucking the insulation material into the envelope, to give a density of material in the envelope of the order of 20 to 150 kg/m$^3$. The envelope is then sealed and measures taken, if necessary, to distribute the thermal insulation material to produce an uncompressed panel such as that shown in FIG. 2.

Figure 3:
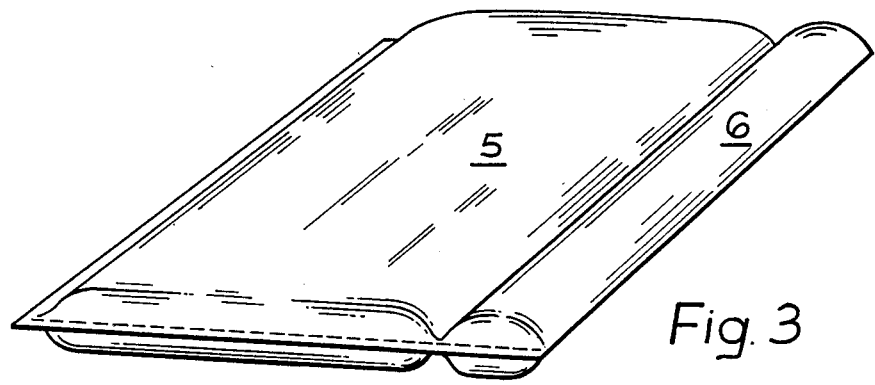
FIG. 3 shows the panel after compaction.
Figure 4:
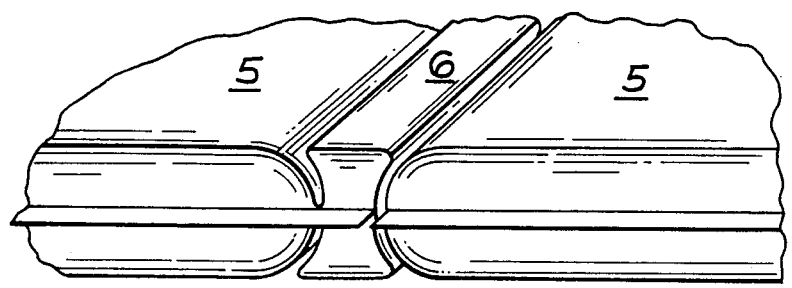
FIG. 4 shows how two panels may be placed adjacent to each other without any deficiency of thermal insulation material arising.

The envelope is subsequently compressed between two platens of a press so that the main portion is consolidated into a rigid, or substantially rigid, panel but the edge portion is dimensioned so that it is not substantially compacted and remains soft and flexible. Such a compacted panel is shown in FIG. 3.

However, the panel shown in FIG. 3 may also be obtained by first producing a rigid, or substantially rigid, panel having the required dimensions for the main portion and subsequently securing by means of stitching or an adhesive an edge portion in the form of a tube of porous or non-porous material containing uncompacted insulation material along one or more sides of the main portion.

The edge portion of the panel may be filled with the same thermal insulation material as the main portion or, for example when particular properties are required of the edge portion, a different thermal insulation material may be used for the edge portion.

The following example is illustrative of the present invention. A number of envelopes were sewn from glass fibre cloth to give a main portion having an area of 95 by 400 mm and a thickness of 10 mm and an edge portion having a nominal diameter of 10 mm. One end of the edge portion was left open and a small hole was left unsewn in the corresponding edge of the main portion. The envelope was placed in a box and separate nozzles were introduced into the main portion and the edge portion. The box was evacuated to suck insulation material through the nozzles into the envelope. The edge portion was filled with a mixture having particularly good flow properties and consisting of 66 per cent by weight pyrogenic silica and 34 per cent by weight rutile, while the main portion was filled with a mixture consisting of 63 per cent by weight pyrogenic silica, 33 per cent by weight rutile and 4 per cent by weight aluminosilicate fibre.

The edge portion assumed a generally circular cross-section and the thermal insulation material therein had a bulk density of approximately 100 kg/m$^3$. The main portion had a bulk density of approximately 80 kg/m$^3$.

Other envelopes were filled with the same thermal insulation materials and it was found that the portions could be filled simultaneously or separately with no differences between the resulting filled envelopes.

The envelopes were then sealed and placed between the platens of a press and a pressure of approximately 75 p.s.i. was applied uniformly to each of the envelopes. When the pressure was released it was found that the main portion had consolidated to a substantially rigid panel having a bulk density of approximately 240 kg/m$^3$, but that the edge portion remained soft and flexible and had not been compacted with the bulk density remaining at approximately 100 kg/m$^3$.

Figure 5:
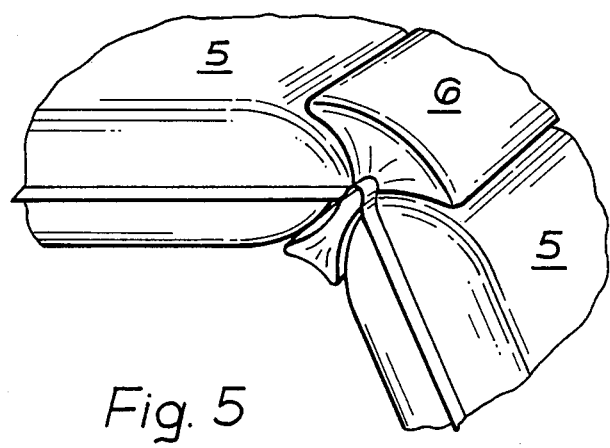
FIG. 5 shows a single panel having a relatively soft and flexible portion intermediate the ends thereof, the panel being flexed about the axis of the soft and flexible portion.

FIG. 5 shows a part of a panel which has been formed in the same manner as the panel of FIG. 3, but in the case of the panel shown in FIG. 5 two lines of stitching (not shown) have been made across the envelope intermediate the ends thereof, the envelope was then filled with thermal insulation material and compacted as described above. The resulting panel had two substantially rigid portions interconnected by a soft and flexible portion enabling the panel to be flexed about the soft and flexible portion with the soft and flexible portion eliminating any deficiency of thermal insulation which would otherwise occur between the two substantially rigid portions of the panel.

I claim:

1. A panel of thermal insulation material comprising: at least one rigid or substantially rigid main panel portion, said main panel portion comprising a dry particulate insulation material compressed within a porous envelope; and
   at least one auxiliary panel portion secured to and extending along at least one edge of said at least one main panel portion, said at least one auxiliary panel portion comprising a substantially uncompressed dry particulate insulation material contained within an envelope.

2. A panel according to claim 1, wherein the insulation material of said at least one auxiliary panel portion is the same as the insulation material of said at least one main panel portion.

3. A panel according to claim 2, wherein the insulation material comprises a microporous thermal insulation material.

4. A panel according to claim 3, wherein the microporous thermal insulation material comprises a finely divided metal oxide powder.

5. A panel according to claim 4, wherein the finely divided metal oxide powder is selected from the group consisting of silica, alumina and titania.

6. A panel according to claim 3, wherein an infra-red opacifying powder is mixed with the microporous thermal insulation material.

7. A panel according to claim 6, wherein the opacifying powder is selected from the group consisting of titania in anatase or rutile form, ilmenite, iron oxide, chromium oxide, metallic flakes and carbon.

8. A panel according to claim 3, wherein a reinforcing fibre is mixed with the microporous thermal insulation material.

9. A panel according to claim 8, wherein the reinforcing fibre is selected from the group consisting of ceramic fibre, glass fibre, alumina fibre, mineral wool and organic fibre.

10. A panel according to claim 1, wherein the porous envelope of said at least one main panel portion is made of a material selected from the group consisting of glass fabric, a porous inorganic material, a porous organic material and a porous metallic material.

11. A panel according to claim 1, wherein the envelope of said at least one auxiliary panel portion is made of a material selected from the group consisting of glass fabric, a porous inorganic material, a porous organic material, a porous metallic material and a non-porous material.

12. A panel according to claim 1, wherein the or each said at least one auxiliary panel portion is formed integrally with the or each said at least one main panel portion.

13. A panel according to claim 1, wherein the or each said at least one auxiliary panel portion is secured to the or each said at least one main panel portion subsequent to the compression of the or each said at least one main panel portion.

* * * * *